(12) United States Patent
Yamada (10) Patent No.: US 8,701,206 B2
(45) Date of Patent: Apr. 15, 2014

(54) INFORMATION PROCESSING APPARATUS AND METHOD OF CONTROLLING THE SAME

(75) Inventor: Tetsuya Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/423,541

(22) Filed: Mar. 19, 2012

(65) Prior Publication Data

US 2012/0260350 A1    Oct. 11, 2012

(30) Foreign Application Priority Data

Apr. 5, 2011    (JP) ................................. 2011-084080

(51) Int. Cl.
*G06F 7/04*    (2006.01)
*G06F 17/30*   (2006.01)
*H04N 7/16*    (2011.01)

(52) U.S. Cl.
USPC .................... 726/28; 726/16; 726/21; 726/27

(58) Field of Classification Search
USPC ..................................... 726/16–17, 21, 27–28
See application file for complete search history.

(56) References Cited

U.S. PATENT DOCUMENTS

| | | | | |
|---|---|---|---|---|
| 7,093,285 B2* | 8/2006 | Singhani et al. | ................... | 726/8 |
| 7,725,731 B2* | 5/2010 | Brown et al. | ................. | 713/183 |
| 7,725,924 B2* | 5/2010 | Terao | ................................. | 726/2 |
| 8,056,126 B2* | 11/2011 | Otake et al. | ..................... | 726/17 |
| 8,151,362 B2* | 4/2012 | Miyamoto | ........................ | 726/28 |
| 2005/0198319 A1* | 9/2005 | Chan et al. | ..................... | 709/228 |
| 2006/0215990 A1* | 9/2006 | Proebstel | ........................ | 386/83 |
| 2007/0143861 A1* | 6/2007 | Ohishi | ............................ | 726/28 |
| 2007/0282995 A1* | 12/2007 | Mizuno et al. | ................ | 709/223 |
| 2010/0100968 A1* | 4/2010 | Urasawa | ......................... | 726/28 |
| 2012/0185933 A1* | 7/2012 | Belk et al. | ....................... | 726/17 |

FOREIGN PATENT DOCUMENTS

JP    2004-122778 A    4/2004

* cited by examiner

*Primary Examiner* — Jeffrey Pwu
*Assistant Examiner* — Jayesh Jhaveri
(74) *Attorney, Agent, or Firm* — Carter, DeLuca, Farrell & Schmidt LLP (57) ABSTRACT

An information processing apparatus of this invention displays an operation window which allows selection of any of multiple applications. Each of the applications includes multiple functions with use authorization being set for each of the functions. The information processing apparatus displays, upon accepting selection of a specific application having some of the multiple functions for which use authorization which requires authentication of a user is set, an authentication window for authentication of the user. The authentication window allows use of the specific application to be selected without authentication of the user, by permitting use of a function, of the multiple function of the specific application, for which use authorization requiring no authentication of the user is set.

4 Claims, 11 Drawing Sheets

| APPLICATION NAME | FUNCTION IN USE | | | |
|---|---|---|---|---|
| | SCAN | SAVE | TRANSMIT | PRINT |
| COPY | yes | no | no | yes |
| SCAN AND TRANSMIT | yes | no | yes | no |
| SCAN AND SAVE | yes | yes | no | no |

FIG. 4

| FUNCTION RESTRICTION ITEM OF COPY APPLICATION | ROLE-SPECIFIC SET VALUE | | |
|---|---|---|---|
| | Administrator | General | Guest |
| COLOR PRINTING/ MONOCHROME PRINTING | NO RESTRICTION | NO RESTRICTION | ONLY MONOCHROME PRINTING |
| SINGLE-SIDED PRINTING/ DOUBLE-SIDED PRINTING | NO RESTRICTION | ONLY DOUBLE-SIDED PRINTING | ONLY DOUBLE-SIDED PRINTING |
| PRINT PAGE LAYOUT | NO RESTRICTION | NO RESTRICTION | NO RESTRICTION |

FIG. 5

| APPLICATION NAME | Administrator | General | Guest |
|---|---|---|---|
| COPY | PERMITTED | PARTIALLY PERMITTED | PARTIALLY PERMITTED |
| SCAN AND TRANSMIT | PERMITTED | PERMITTED | INHIBITED |
| SCAN AND SAVE | PERMITTED | PERMITTED | PERMITTED |

FIG. 6

| USER ID | DISPLAY NAME | ROLE | MAIL ADDRESS |
|---|---|---|---|
| guest | Guest | Guest | |
| mizuno | mizuno | Administrator | mizuno@XXX.com |
| yamada | yamada | General | yamada@XXX.com |
| hosoda | hosoda | General | hosoda@XXX.com |

ENTER USER NAME AND PASSWORD

USER NAME: ☐ ─901

PASSWORD: ☐ ─902

[ CANCEL ]─903   [ LOG IN ]─904

FIG. 10

ENTER USER NAME AND PASSWORD

USER NAME: ☐ ─1001

PASSWORD: ☐ ─1002

[ CANCEL ]─1003   [ LOG IN ]─1004   [ SKIP ]─1005

| APPLICATION NAME | Administrator | General | Guest |
|---|---|---|---|
| COPY | PERMITTED | PERMITTED | PERMITTED |
| COPY (GUEST) | PERMITTED | PERMITTED | PERMITTED |
| SCAN AND TRANSMIT | PERMITTED | PERMITTED | INHIBITED |
| SCAN AND SAVE | PERMITTED | PERMITTED | PERMITTED |

FIG. 15

| APPLICATION NAME | DERIVED BUTTON |
|---|---|
| COPY | YES |
| SCAN AND TRANSMIT | NO |
| SCAN AND SAVE | NO |

INFORMATION PROCESSING APPARATUS AND METHOD OF CONTROLLING THE SAME

BACKGROUND OF THE INVENTION

1. Field of the Invention

The present invention relates to an information processing apparatus which can restrict the use of each function of an application of the apparatus for each user and a method of controlling the apparatus.

2. Description of the Related Art

There is available a multi function peripheral (MFP) which has a scan function, print function, and transmission function and has various kinds of applications using the functions. There is also available an MFP which has a user authentication function and allows to restrict the use of the MFP itself. In addition, there is available an MFP which implements use restriction on each application of the MFP (see, for example, Japanese Patent Laid-Open No. 2004-122778). Such restriction of the use of each application is effective when, for example, allowing any user to use a copy application while restricting the use of an application which transmits scanned images to the outside from the viewpoint of security.

Furthermore, there is available an MFP which implements use restriction on each function used by an application of the MFP. Methods of implementing use restriction on each function can be roughly classified into two types of methods respectively based on "device authentication" and "functions-specific authentication". Device authentication is a scheme of performing authentication without fail every time the MFP is used, and providing, on an UI for an application, only the functions which the authenticated user can use. Function-specific authentication equally allows every user to log in as a special user called a guest who is permitted to use only the minimum function, and displays an authentication window when the user accesses a function which is not permitted to the guest user. If the authentication is successful, this scheme permits the authenticated user to use the application using the function.

Conventional device authentication requires authentication processing without fail at the start of the use of an information processing apparatus. Therefore, a drawback of this scheme is that even when using an application without any use restriction on the function, the user is forced to perform input operation for authentication. In contrast to this, conventional function-specific authentication is designed to perform authentication processing only when a user tries to use an application using a function with use restriction. This can minimize the input operation forced on the user.

Even when function-specific authentication is to be performed, the user may think that it is not necessary to change default settings depending on the functions. In such a case, this authentication processing forces the user to perform cumbersome operation for the following reason. Assume that when the user uses a copy application, settings such as the number of copies and double-sided printing/single-sided printing of the detailed settings of the print function are default settings, and a restriction is imposed on the default settings so as not to change them. Even in this case, the user may think that there is no need to change the default settings.

SUMMARY OF THE INVENTION

The present invention has been made in consideration of this problem. An information processing apparatus of the present invention provides a mechanism of improving the convenience for users by allowing all the users to equally log in as guest users at the start of use of the apparatus, and authenticating a user as needed when he/she selects an application having a function with use restriction.

According to one aspect of the present invention, there is provided an information processing apparatus comprising: an acceptance unit that displays, on an operation unit, an operation window which allows selection of any of a plurality of applications, each including a plurality of functions, with use authorization being set for each of the functions, and accepts selection of an application via the operation window; a determination unit that determines whether the acceptance unit has accepted selection of a specific application having some of the plurality of functions for which use authorization which requires authentication of a user is set; a display control unit that displays, on the operation unit, when the determination unit determines that the acceptance unit has accepted the selection of the specific application, an authentication window for authentication of the user, which allows use of the specific application to be selected without authentication of the user; and a control unit that permits use of a function, of the plurality of functions of the specific application, for which use authorization requiring no authentication of the user is set, when use of the specific application is selected via the authentication window without performing authentication of the user.

According to another aspect of the present invention, there is provided a method of controlling an information processing apparatus, the method comprising: displaying, on an operation unit, an operation window which allows selection of any of a plurality of applications, each including a plurality of functions, with use authorization being set for each of the functions, and accepting selection of an application via the operation window; determining whether selection of a specific application having some of the plurality of functions for which use authorization which requires authentication of a user is set has been accepted in the accepting; displaying, on the operation unit, when it is determined in the determining that the selection of the specific application has been accepted in the accepting, an authentication window for authentication of the user, which allows use of the specific application to be selected without authentication of the user; and permitting use of a function, of the plurality of functions which the specific application has, for which use authorization requiring no authentication of the user is set, when use of the specific application is selected via the authentication window without performing authentication of the user.

The present invention can provide a mechanism of improving the convenience for users by allowing all the users to equally log in as guest users at the start of use of an information processing apparatus, and authenticating a user as needed when he/she selects an application having a function with use restriction.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

An MFP will be described below as an example of an information processing apparatus according to the present invention.

(First Embodiment)

The first embodiment of the present invention will be described below.

<<Hardware Arrangement>>

Figure 1:
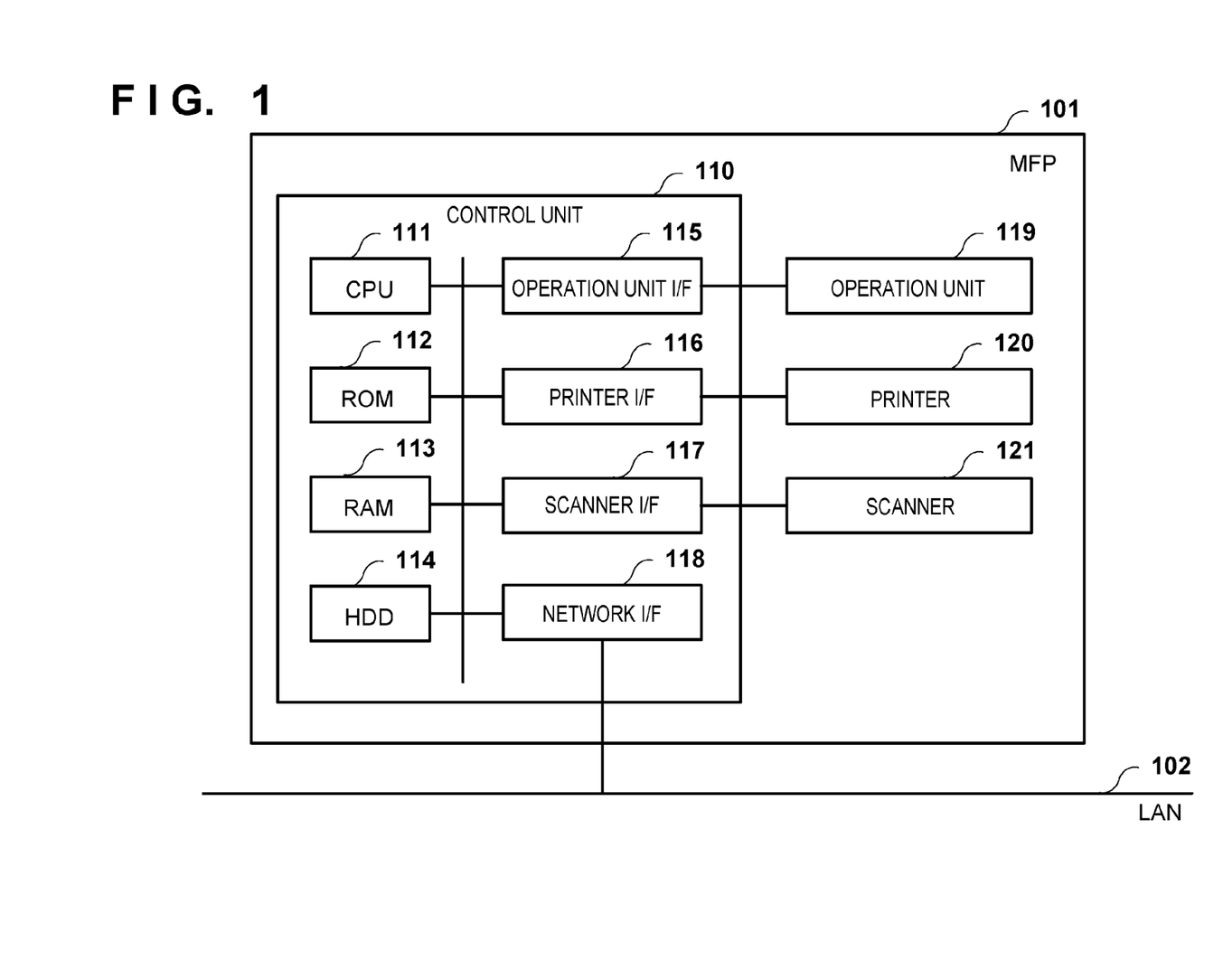
FIG. 1 is a block diagram showing the arrangement of an MFP 101.

FIG. 1 is a block diagram showing the arrangement of an MFP 101. A control unit 110 including a CPU 111 controls the overall operation of the MFP 101. The CPU 111 reads out control programs stored in a ROM 112 and performs various kinds of control operations such as read control and transmission control. A RAM 113 is used as a temporary storage area such as the main memory or work area of the CPU 111.

An HDD 114 stores image data, various kinds of programs, and various kinds of information tables (to be described later). An operation unit I/F 115 connects an operation unit 119 to the control unit 110 (display control unit).

A printer I/F 116 connects a printer 120 to the control unit 110. The control unit 110 transfers image data to be printed by the printer 120 to the printer 120 via the printer I/F 116. The printer 120 then prints the image data on a recording medium.

A scanner I/F 117 connects a scanner 121 to the control unit 110. The scanner 121 generates image data by reading an image on a document, and inputs the data to the control unit 110 via the scanner I/F 117.

A network I/F 118 connects the control unit 110 (MFP 101) to a LAN 102. The network I/F 118 transmits information such as image data to external apparatuses (for example, a Web server 102) on the LAN 102 and receives various kinds of information from external apparatuses on the LAN 102.

<<Software Arrangement>>

Figure 2:
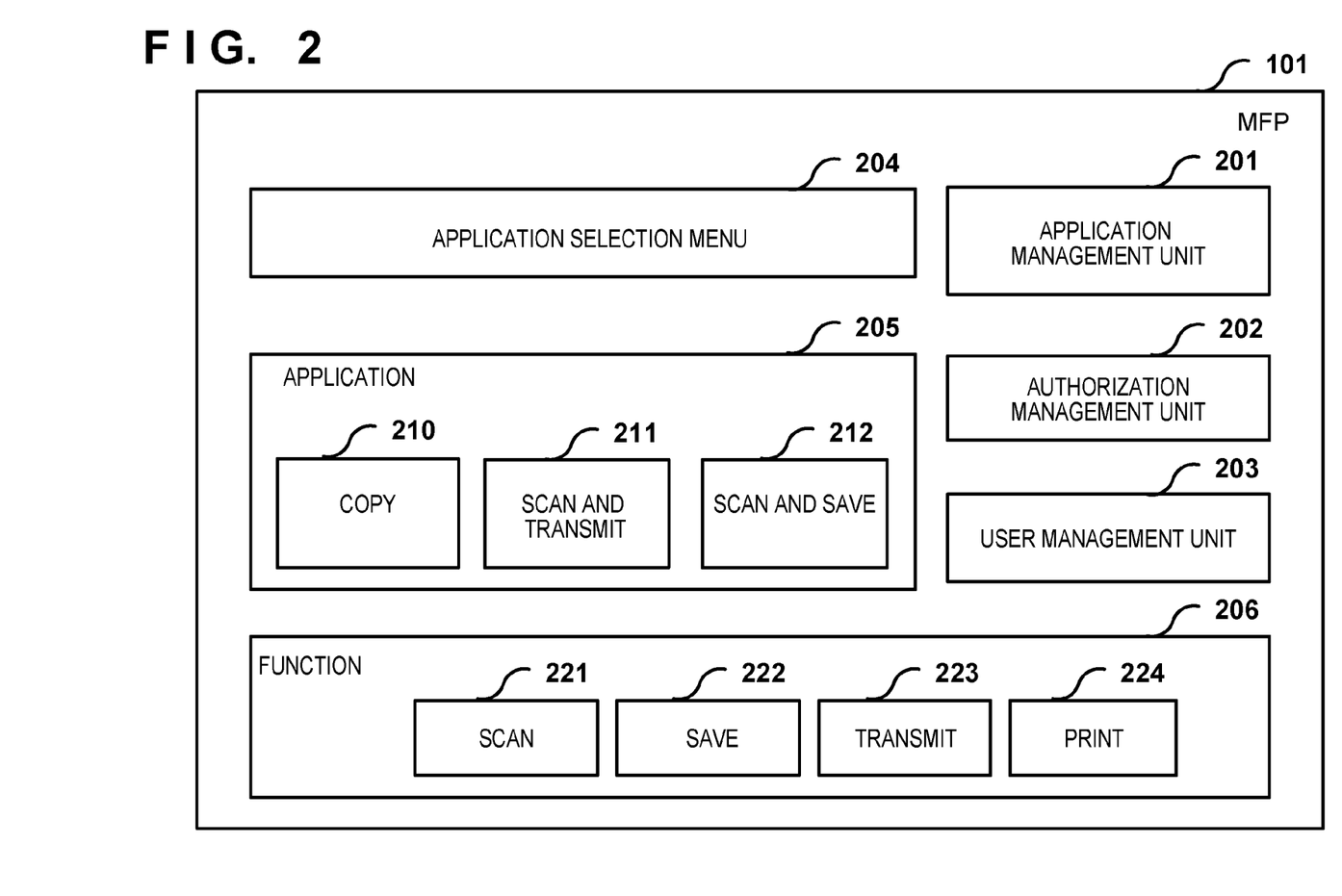
FIG. 2 is a block diagram showing the arrangement of software in the MFP 101.

The software arrangement of the MFP 101 will be described with reference to FIGS. 2 to 7. FIG. 2 is a block diagram showing the software arrangement associated with this embodiment in the MFP 101. The CPU 111 reads out and executes programs stored in the ROM 112 or the HDD 114 to implement the functions of the respective applications shown in FIG. 2 and the functions of the respective management units on the MFP 101.

Figure 3:
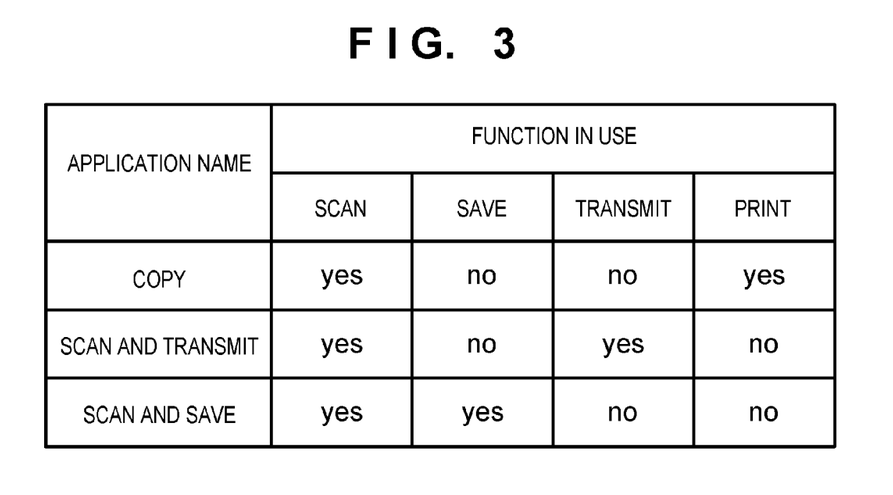
FIG. 3 is a view showing an example of a table of functions used by applications managed by an application management unit 201.

An application management unit 201 manages information such as the states of the applications installed in the MFP 101. FIG. 3 shows one example of the information of applications managed by the application management unit 201, and is a management table of the functions of the MFP 101 which the respective applications use. Each application has a file in which the function to be used is declared. This table registers information indicating whether each application uses each function when the application is installed.

In the example shown in FIG. 3, three applications, namely "copy", "scan and transmit", and "scan and save", are installed. The application "copy" is managed as an application for scanning a document by using a scan function and printing based on the generated document image data by using a print function. The application "scan and transmit" is managed as an application for scanning a document by using the scan function and transmitting the generated document image data to a designated address by using a transmission function (for example, a facsimile function or electronic mail function). The application "scan and save" is managed as an application for scanning a document by using the scan function and saving the generated document image data in the RAM 113 or HDD 114 of the MFP 101 by using a save function.

An authorization management unit 202 manages use restrictions on users belonging to any of authorization groups at a plurality of levels for each function and each application. This authorization group will be simply referred to as a "role" hereinafter. Assume that this embodiment includes three roles, namely "Administrator", "General", and "Guest". The Administrator role is assigned to only users having management authorization. The General role is assigned to only general authorization users. The Guest role is assigned to only users having neither management authorization nor general authorization (unauthenticated users). Users who belong to the Administrator role, the General role, and the Guest role will also be referred to as Administrator users, General users, and Guest users, respectively.

Figure 4:
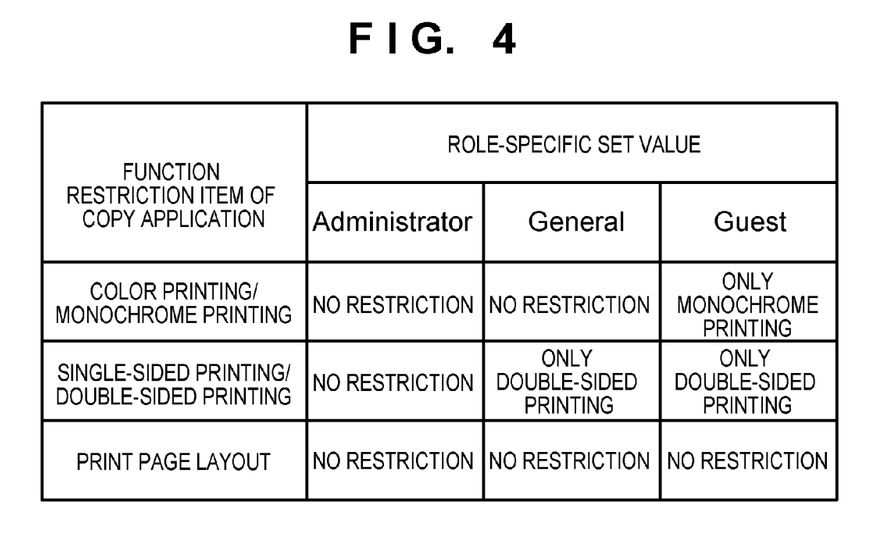
FIG. 4 is a view showing a table of access restrictions for each role on the detailed functions of the copy application managed by an authorization management unit 202.

FIG. 4 shows a management table for managing restriction items associated with the functions of the copy application of the three applications described above for each role. The management table shown in FIG. 4 is one kind of information managed by the authorization management unit 202, and includes information indicating whether to permit the use of the "copy" application at a plurality of levels. As indicated by the respective rows of the management table, the copy application has, for example, three functions, namely "color printing/monochrome printing", "single-sided printing/double-sided printing", and "print page layout". As shown in FIG. 4, "color printing/monochrome printing" is provided with two use levels, namely "no restriction" and "only monochrome printing permitted". Likewise, "single-sided printing/double-sided printing" is provided with two use levels, namely "no restriction" and "only double-sided printing permitted", and "page layout" is provided with two use levels, namely "no restriction" and "Nin1 inhibited".

Figure 5:
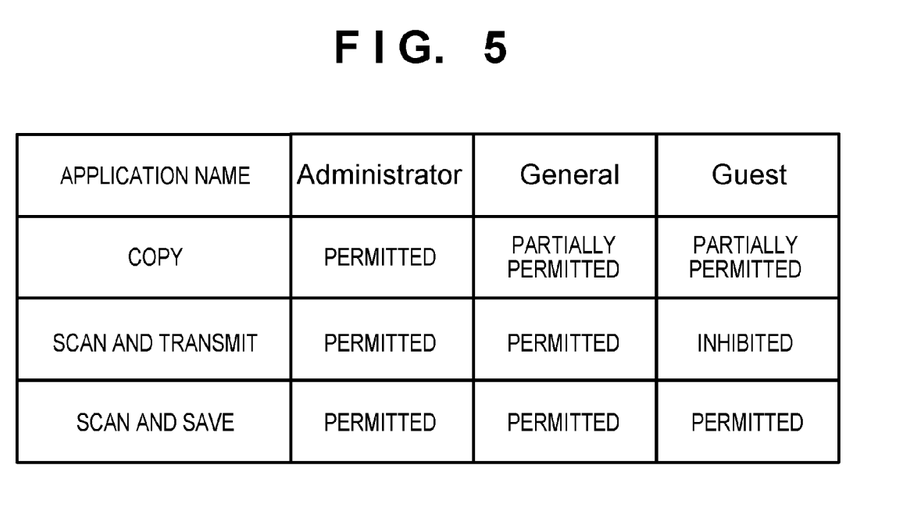
FIG. 5 is a view showing an example of a table of access restrictions for each role on the applications managed by the authorization management unit 202.

FIG. 5 shows a management table for managing whether to unconditionally permit the use of all the functions of each application, permit the use of only some of the functions, or totally inhibit the use of the functions. Since no function restrictions are imposed on the Administrator role for the copy application as shown in FIG. 4, "permitted" is set in FIG. 5. Since a function restriction that permits only the use of "double-sided printing" (that is, the use of "single-sided printing" is inhibited) is imposed on the General role for the copy application as shown in FIG. 4, "partially permitted" is set in FIG. 5. Since a function restriction that permits only the use of "monochrome printing" (that is, "color printing" is inhibited) and a function restriction that permits only the use of "double-sided printing" (that is, "single-sided printing" is inhibited) are imposed on the Guest role for the copy application as shown in FIG. 4, "partially permitted" is set for the Guest role for the copy application in FIG. 5.

Although not shown here, the authorization management unit 202 includes management tables like that shown in FIG. 4 for the respective applications of "scan and transmit" and "scan and save". Therefore, it is possible to set information indicating use authorization for application (permitted/inhibited/partially permitted) on each of the applications of "scan and transmit" and "scan and save" in the management table in FIG. 5 for each role.

Figure 6:
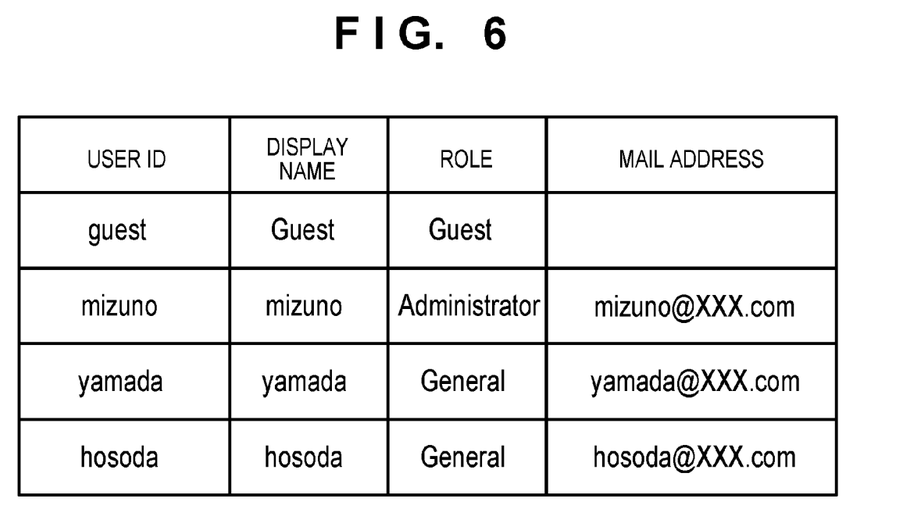
FIG. 6 is a view showing an example of user information managed by a user management unit 203.

A user management unit 203 manages users who use the MFP 101 and provides an authentication window for authenticating the users. FIG. 6 shows an example of user information managed by the user management unit 203. Referring to FIG. 6, the user management unit 203 manages pieces of information such as user IDs for uniquely identifying users, display names, roles to which the users belong, and mail addresses. When a user inputs predetermined information (for example, a user ID and password) when logging in, the input information is collated with the information managed by the user management unit 203. If authentication is successful, the user is allowed to log in as a user belonging to a corresponding role. Alternatively, at the startup of a device for performing function-specific authentication, the user is automatically allowed to log in as a Guest user.

Figure 7:
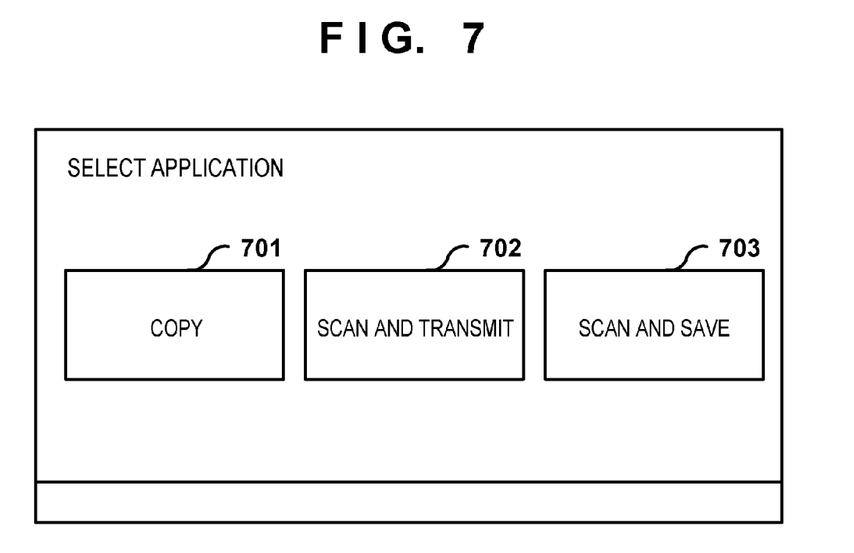
FIG. 7 is a view showing an example of an application selection menu.

An application selection menu 204 provides a window for prompting a user to select an application. FIG. 7 shows an example of an application selection window to be displayed on the operation unit 119. When the user presses a button on the window, the window shifts to a window for providing an application corresponding to each button.

Applications 205 include applications installed in the MFP 101. Each application provides functions by combining functions of the MFP 101, and also provides a UI for the application. FIG. 4 shows the applications included in the management table shown in FIG. 3 as applications 210 to 212.

Functions 206 are the basic functions using the hardware and software of the MFP 101. The functions 206 have no UI, and are used by applications.

<<Operation Procedure>>

An operation procedure will be described in detail next with reference to the flowchart of FIG. 8. Each piece of software shown in FIG. 2 can implement the processing in a corresponding one of the steps in FIG. 8. That is, the CPU 111 implements the processing in each step on the MFP 101 by reading out and executing the programs stored in the ROM 112 or the HDD 114.

When starting the MFP 101, an application selection menu window is displayed on the operation unit 119 in step S801. At this time, a Guest user as the Guest role has logged in to the MFP 101. The application selection menu window displays buttons 701 to 703 for the selection of three applications, as shown in FIG. 7. That is, the applications "copy", "scan and transmit", and "scan and save" are installed in the MFP 101 in advance, and are set ready for use.

If the apparatus detects in step S802 that the user has pressed a button on the application selection menu, the process advances to step S803. The apparatus then determines window control to be performed thereafter depending on use authorization by inquiring the authorization management unit 202 about the use authorization of the Guest role with respect to the application corresponding to the button pressed by the user.

If the apparatus determines the use authorization for the application by the Guest user as "permitted" upon inquiring about use authorization in step S803, the process advances to step S804 to display an application window indicating that all the functions can be used according to the authorization of the Guest user. Assume that the user has pressed the button of "scan and save" on the application selection menu. In this case, since the authorization management table for each application in FIG. 5 permits the Guest role to use the application "scan and save", the apparatus displays a window for the application "scan and save" in step S804.

If the apparatus does not determine the use authorization for the application as "permitted" upon inquiring about the use authorization in step S803, the process advances to step S805 to determine whether the use authorization for the application is "inhibited". If the apparatus determines the use authorization for the application as "inhibited" in step S805, the process advances to step S806 to display an authentication window on the operation unit 119. Assume that the user has pressed the button of "scan and save" on the application selection menu. In this case, since the authorization management table for each application in FIG. 5 inhibits the Guest role from using the application "scan and transmit", the process advances to step S806 to display an authentication window like that shown in FIG. 9.

In step S807, after step S806, the apparatus determines, based on the input operation by the user via the authentication window, whether the authentication is successful. If the authentication is successful, the process advances to step S804 to display an application window corresponding to the functions which can be used by the authenticated user (other than a Guest user) in accordance with his/her use authorization on the operation unit 119. If the authentication has failed, the process returns to step S806. In this case, the apparatus may display information indicating an error. Assume that the user has input a user name and a password in fields 901 and 902 on the authentication window in FIG. 9 and pressed a login button 904, and the authentication is successful. In this case, the window shifts to the application window of "scan and transmit". Note that if the user presses a cancel button 903, the window display shifts to the application selection menu in step S801.

Figure 9:
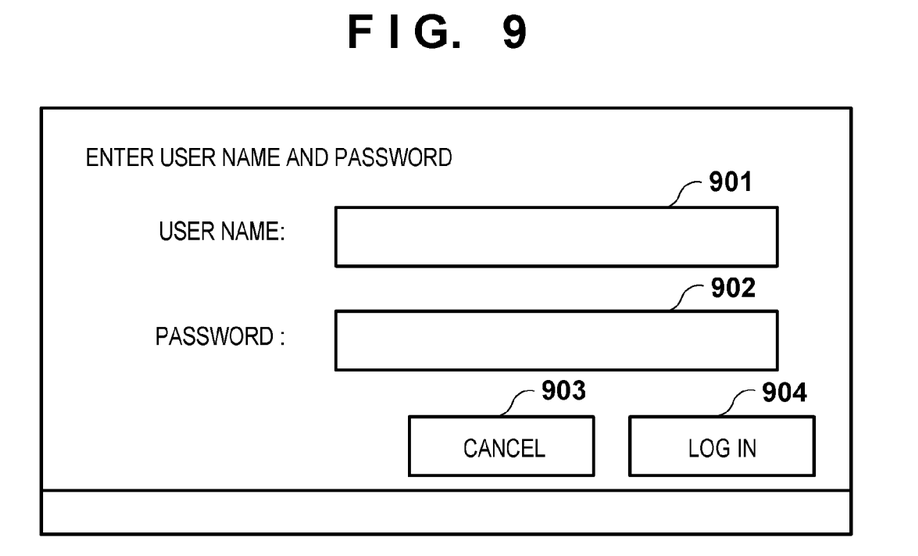
FIG. 9 is a view showing an example of a normal authentication window.
Figure 10:
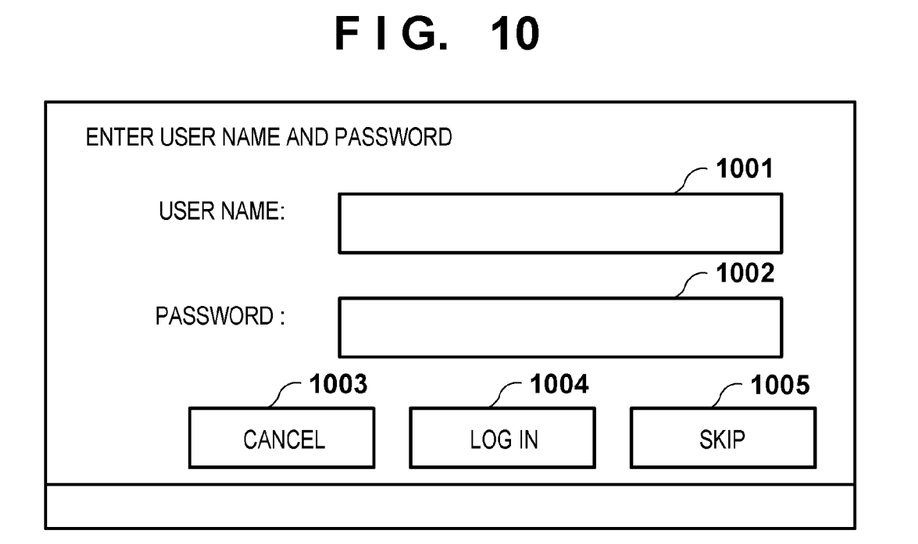
FIG. 10 is a view showing an example of an authentication window with a skip button.

If the apparatus does not determine the use authorization for the application as "inhibited" in step S805, that is, determines the use authorization as "partially permitted", the process advances to step S808 to display an authentication window with a skip button which allows to skip authentication processing. Assume that the user has pressed the button of "copy" on the application selection menu. In this case, since the authorization management table for each application in FIG. 5 partially permits the Guest role to use the application "copy", the apparatus displays an authentication window like that shown in FIG. 10 in step S808. The authentication window in FIG. 10 differs from that in FIG. 9 in that a skip button 1005 exists.

In step S809, the apparatus determines whether the user has pressed the skip button on the authentication window. If the user has not pressed the skip button, the process advances to step S810 to determine whether the authentication is successful upon input operation by the user via the authentication window. If the authentication is successful, the process advances to step S804 to display, on the operation unit 119, an application window corresponding to the functions which can be used by the authenticated user (other than a Guest user) in accordance with his/her use authorization.

If the user has pressed the skip button, the process advances to step S811 to display, on the operation unit 119, an application window indicating that only the functions permitted to the Guest user can be used. If, for example, the user has pressed the skip button, the apparatus displays a copy application window corresponding to the use authorization of the Guest role. A case in which the use of the application is partially permitted will be described further in detail below.

<<Detailed Authorization Management>>

Figure 11:
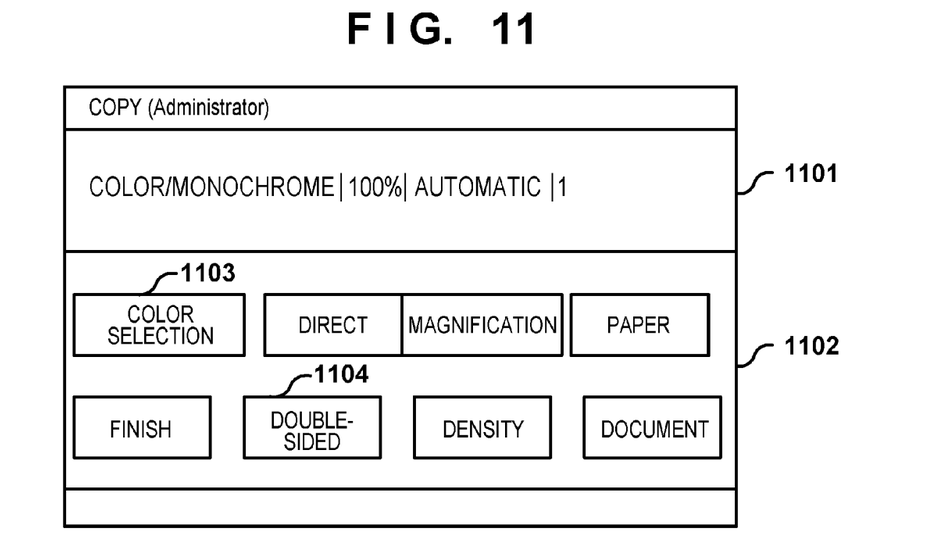
FIG. 11 is a view showing an example of a window of the copy application which can be used by the Administrator role.
Figure 12:
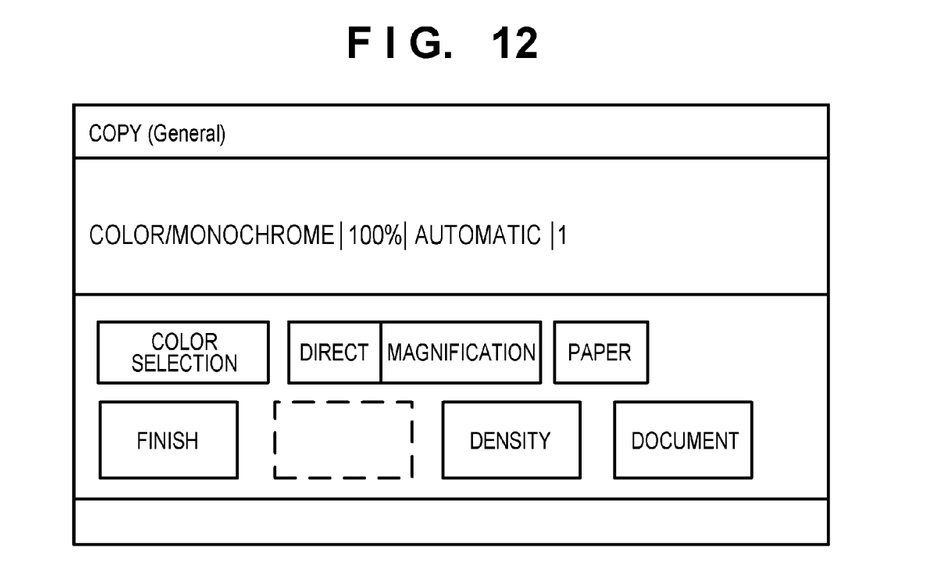
FIG. 12 is a view showing an example of a window of the copy application which can be used by the General role.
Figure 13:
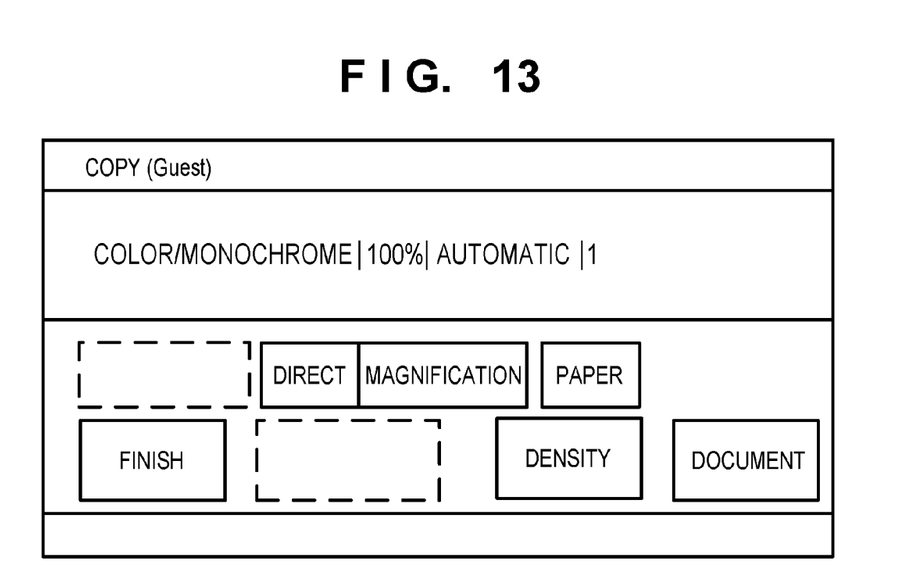
FIG. 13 is a view showing an example of a window of the copy application which can be used by the Guest role.

FIGS. 11, 12, and 13 respectively show examples of copy application windows displayed when the user logs in as the Administrator role, the General role, and the Guest role. FIG. 11 shows a window which allows all the functions of the copy application to be used. An area 1101 displays the current settings. An area 1102 displays buttons for shifting to setting change windows. With reference to FIG. 4, a restriction is imposed on "single-sided printing/double-sided printing" with respect to a General user (a restriction to permit only double-sided printing). A double-sided setting button 1104 displayed in FIG. 11 is hidden in FIG. 12 in order to inhibit the General user from changing the setting from "double-sided printing" to "single-sided printing". A restriction is also imposed on color printing with respect to the Guest user. For this reason, a color selection setting button 1103 displayed in FIG. 11 is hidden in FIG. 13, in which the current setting is "monochrome printing".

<<Correction of Application Management Table>>

Correction of an application management table will be described below. It is possible to separately set authorizations for the respective functions of each application (see FIG. 4) and authorizations for each application itself (see FIG. 5). Assume that in this embodiment, only an Administrator user having administrator authorization can perform this correction processing. In this case, in spite of the fact that an Administrator user has corrected the Guest role field of the copy application in FIG. 5 from "partially permitted" to "permitted", the restriction on each function shown in FIG. 4 may not be canceled. In this case, when a Guest user uses this application, window control is performed to shift from the application selection menu window shown in FIG. 7 to the copy application window for Guest users shown in FIG. 13.

Figure 8:
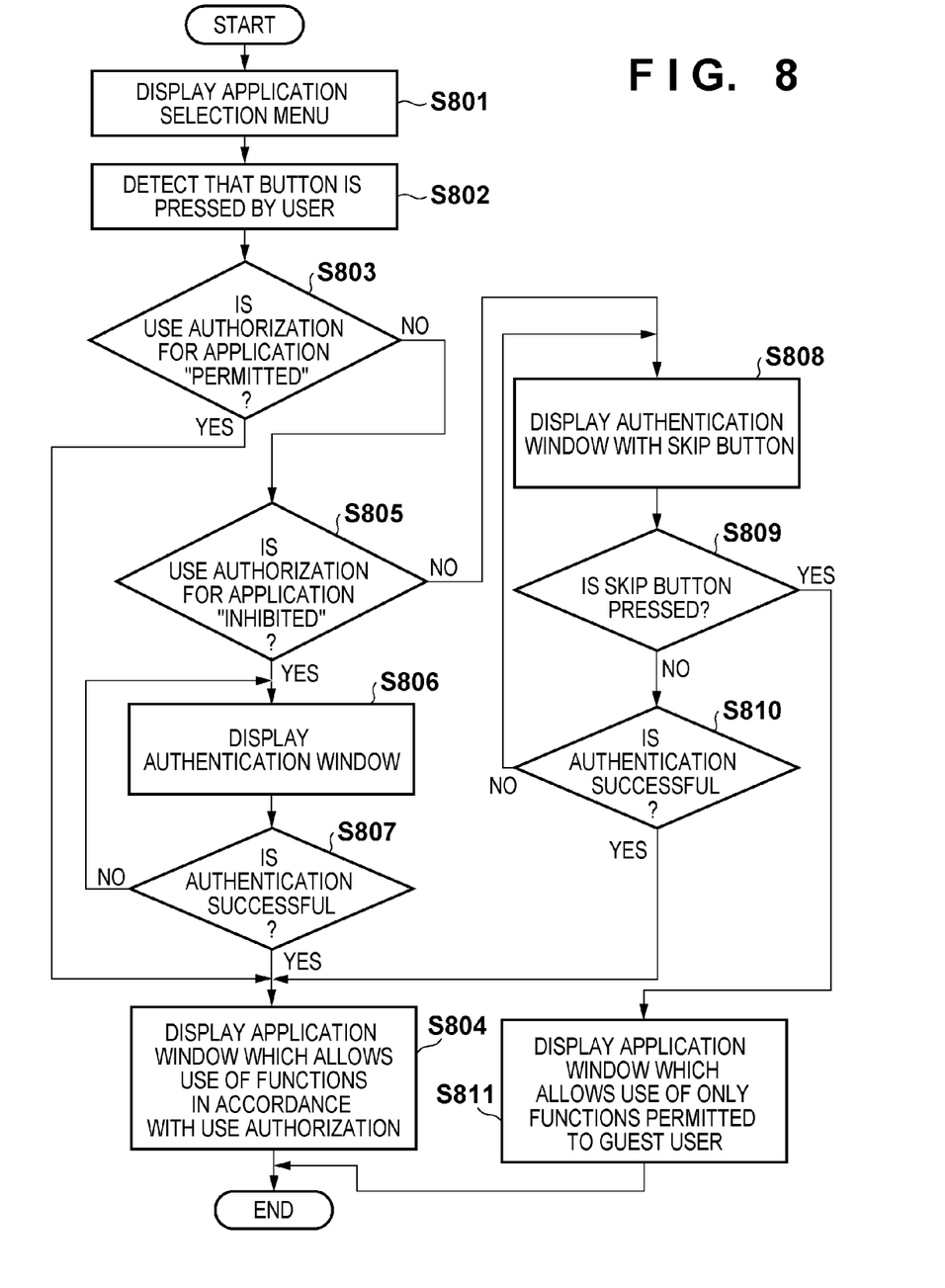
FIG. 8 is a flowchart showing a window transition procedure in the MFP 101 according to the first embodiment.

More specifically, assume that the apparatus determines in step S803 in FIG. 8 that the use of the application is "permitted". In this case, in practice, in spite of the fact that use restriction is imposed on the functions of the application, the apparatus displays an application window which permits the use of all the functions in step S804 in FIG. 8. For this reason, if this restriction is not imposed on the function on which use restriction is imposed in practice, the user who would use the application needs to perform wasteful input operation. That is, even if a user who does not know that he/she cannot use some of functions makes all settings for the use of the functions, he/she cannot use the function in the end, resulting in a deterioration in operative convenience for the user.

For this reason, even if the use authorization for each application with respect to the Guest role is set to "permitted", the apparatus properly corrects the set value of the use authorization for the application by referring to the authorization settings on the functions of the application (FIG. 4). More specifically, if some restrictions are imposed on all the functions of a given application, the apparatus corrects the corresponding set value to "inhibited". If some restrictions are imposed on some functions, the apparatus corrects the corresponding set value to "partially permitted".

In the above case, since the restrictions "only monochrome printing" and "only double-sided printing" are imposed on the Guest role in FIG. 4, the apparatus corrects the setting to "partially permitted". With this operation, even if an Administrator user corrects only the function-specific management table (FIG. 4), an application-specific management table (FIG. 5) is automatically corrected synchronously with the above correction. Thus, it is possible to prevent a deterioration in operative convenience for the user.

(Second Embodiment)

The second embodiment of the present invention will be described below. This embodiment differs from the first embodiment in that an application management table is not corrected.

<<Addition of Button>>

Figure 14:
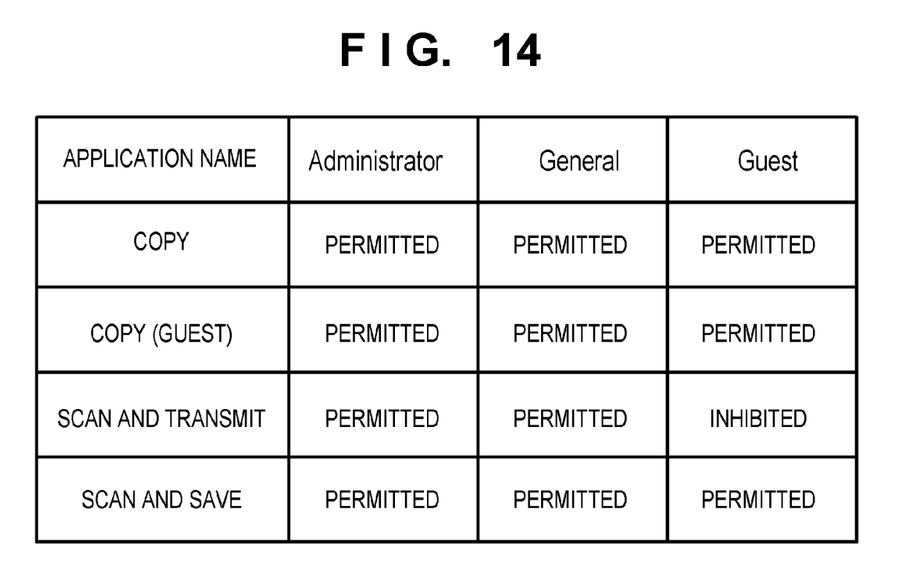
FIG. 14 is a view showing an example of a table of access restrictions for each role on applications managed by an authorization management unit 202 according to the second embodiment.

In the first embodiment, even if use authorization for each application with respect to the Guest role is set to "permitted", when determining, upon referring to the authorization settings on the functions of the application, that some restrictions are imposed on some functions, the apparatus corrects the set value of use authorization for the application to "partially permitted". In contrast to this, in such a case, this embodiment allows a derived button of the "copy" button for the Guest role to the application selection menu to be added without correcting the set value from "permitted" to "partially permitted". As shown in FIG. 14, therefore, an entry in which the application name is "copy (guest)" and the authorization of the Guest role is "permitted" is added to a role-specific access restriction table for the applications managed by an authorization management unit 202.

Figure 15:
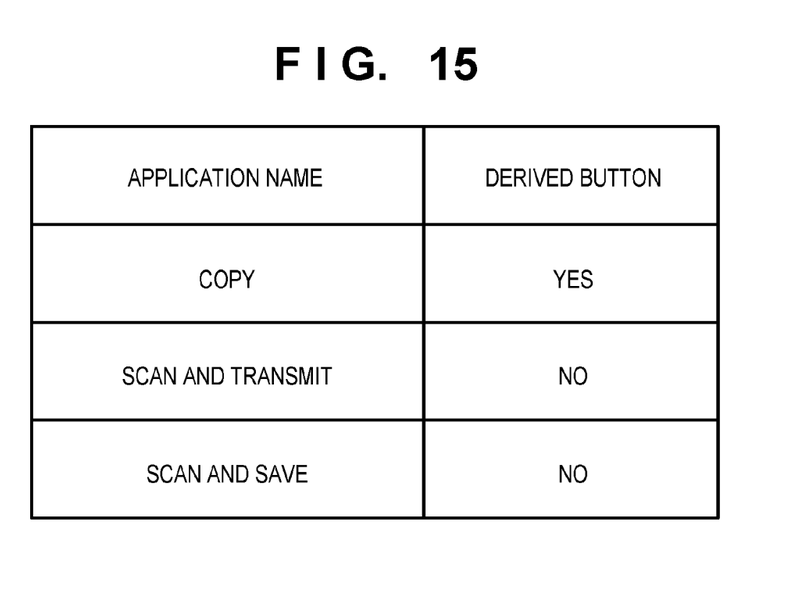
FIG. 15 is a view showing a management table concerning the presence/absence of derived buttons in an application selection menu managed by an application management unit 201 according to the second embodiment.
Figure 16:
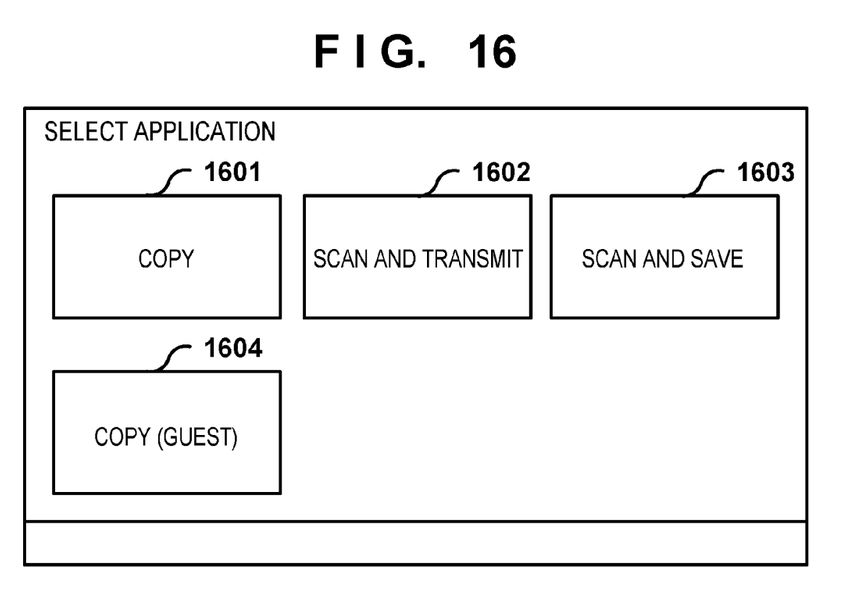
FIG. 16 is a view showing an example of the application selection menu according to the second embodiment.

In this embodiment, an application management unit 201 has a management table including information indicating whether to display a derived button on the application selection menu, as shown in FIG. 15, and sets "yes" (derived button is displayed) for the copy application. This will allow a button 1604 to be added to the application selection menu as shown in FIG. 16.

<<Operation Procedure>>

Figure 17:
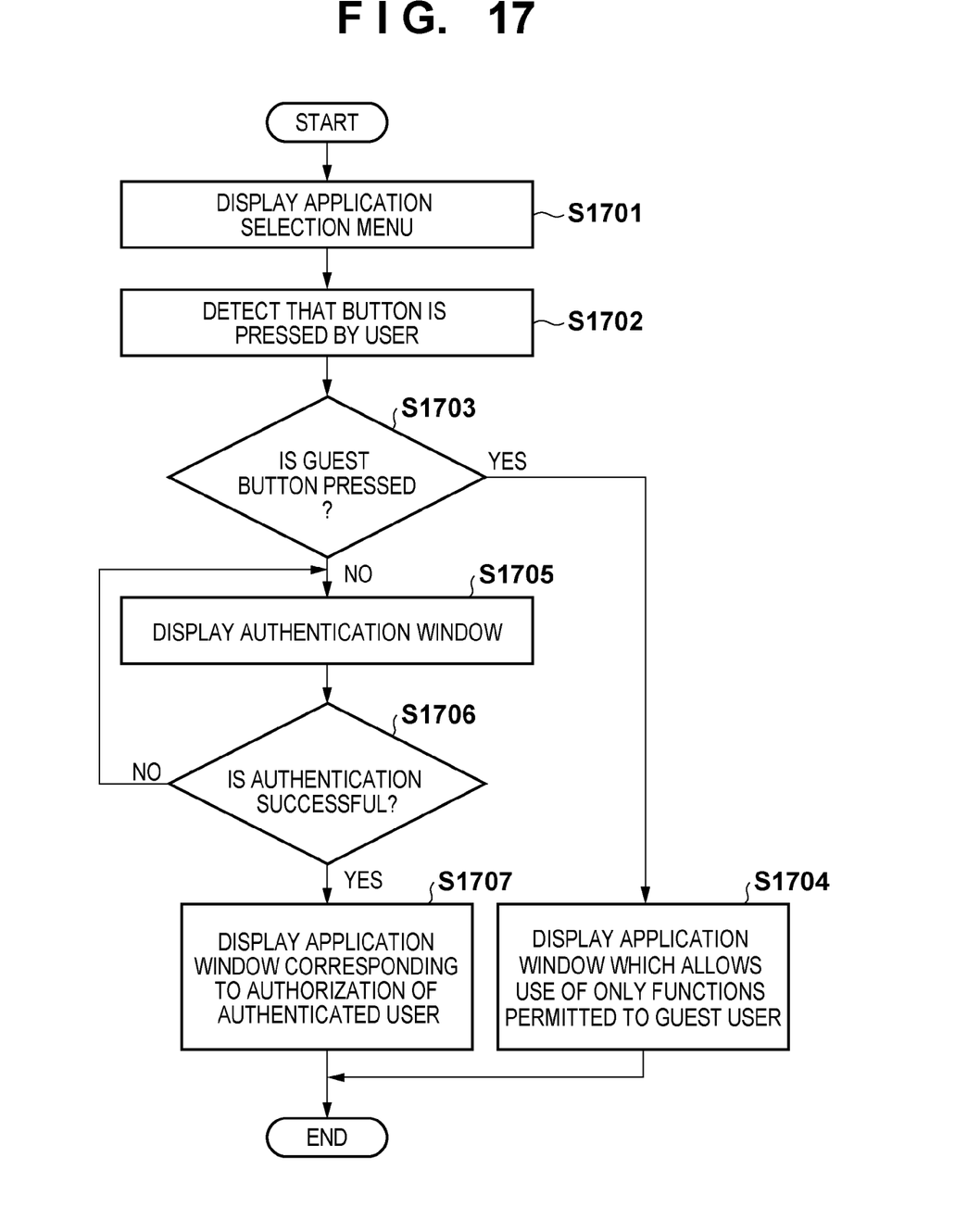
FIG. 17 is a flowchart showing a window transition procedure in an MFP 101 according to the second embodiment.

An operation procedure will be described in detail next with reference to the flowchart of FIG. 17. Each software shown in FIG. 2 implements the processing in each step in FIG. 17. That is, a CPU 111 implements the processing in each step on an MFP 101 by reading out and executing the programs stored in a ROM 112 or an HDD 114.

When starting the MFP 101, an application selection menu window is displayed on an operation unit 119 in step S1701. At this time, a Guest user as the Guest role has logged in to the MFP 101. The application selection menu window displays buttons 1601 to 1603 for the selection of three applications, as shown in FIG. 16, and the added button 1604 for Guest users. That is, the applications "copy", "scan and transmit", and "scan and save" are installed in the MFP 101 in advance, and are set ready for use.

If the apparatus detects in step S1702 that the user has pressed any button on the application selection menu, the apparatus determines in step S1703 whether the user has pressed the Guest user button 1604 on the application selection window. If the user has pressed the Guest user button 1604, the apparatus displays, on the operation unit 119, an application window indicating that only the functions permitted to the Guest user can be used, in step S1704.

If the user has pressed a button other than the Guest user button 1604, the process advances to step S1705 to display an authentication window on the operation unit 119. In step S1706, the apparatus determines, based on the input operation by the user via the authentication window, whether the authentication is successful. If the authentication is successful, the process advances to step S1707 to display an application window corresponding to the authorization of the authenticated user on the operation unit 119. If the authentication has failed, the process returns to step S1705. In this case, the apparatus may display information indicating an error.

If, for example, the user presses the "copy" button 1601 in FIG. 16, the apparatus displays an authentication window regardless of whether the use authorization of the Guest role with respect to the copy application is "permitted". If the authentication is successful, the apparatus displays an application window corresponding to the authorization of the authenticated user on the operation unit 119. In contrast, if the user presses the "copy" button 1604 for the Guest role, the apparatus directly displays, on the operation unit 119, an application window indicating that only the functions permitted to the Guest user can be used, without displaying any authentication window. In the case shown in FIG. 4, since the use of the copy application by the Guest user is restricted to only "monochrome printing" and "double-sided printing", buttons 1103 and 1104 are hidden on the window in FIG. 13.

According to the second embodiment, it is possible to obtain the same effects as those of the first embodiment by displaying the derived button. In addition, when some restrictions are imposed on some of the functions of an application, the user can use the application without temporarily shifting the current window to an authentication window. This makes it possible to further improve the operability.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-084080, filed Apr. 5, 2011, which is hereby incorporated by reference herein in its entirety.

What is claimed is:

1. An information processing apparatus comprising:
a processor; and
a memory storing instructions that, when executed by the processor, cause the information processing apparatus to:
 display an operation window which allows selection of any of a plurality of applications, each including a plurality of functions, with use authorization being set for each of the plurality of applications;
 accept selection of an application via the operation window;
 determine whether or not a specific application has been selected for which use authorization, which requires authentication of a user, is set;
 display, when it has been determined that the specific application has been selected, an authentication window for authentication of the user, wherein an instruction to skip authentication of the user can be accepted while the authentication window is displayed; and
 permit, in a case where the instruction to skip authentication of the user has been accepted, use of the specific application in a state where use of at least one of the plurality of functions included in the specific application is restricted.

2. The apparatus according to claim 1, wherein, in a case where the instruction to skip authentication of the user has not been accepted, use of the specific application is permitted in accordance with use authorization of the user authenticated based on information input via the authentication window.

3. The apparatus according to claim 1, wherein a button for instructing to skip authentication of the user and a field in which information for authentication of the user is configured to be input are displayed on the authentication window.

4. A method of controlling an information processing apparatus, the method comprising:
 displaying, on an operation unit, an operation window which allows selection of any of a plurality of applications, each including a plurality of functions, with use authorization being set for each of the plurality of applications;
 accepting selection of an application via the operation window;
 determining whether or not selection of a specific application for which use authorization which requires authentication of a user is set has been accepted in the accepting;
 displaying, on the operation unit, when it is determined in the determining that the selection of the specific application has been accepted in the accepting, an authentication window for authentication of the user, wherein an instruction to skip authentication of the user can be accepted while the authentication window is displayed on the operating unit; and
 permitting, in a case where the instruction to skip authentication of the user has been accepted, use of, the specific application in a state where use of at least one of the plurality of functions included in the specific application is restricted.

* * * * *